US010592484B1

United States Patent
Sharma et al.

(10) Patent No.: US 10,592,484 B1
(45) Date of Patent: Mar. 17, 2020

(54) DATA MIGRATION BETWEEN DIFFERENT LIGHTWEIGHT DIRECTORY ACCESS PROTOCOL (LDAP) BASED WIRELESS COMMUNICATION SUBSCRIBER DATA STORES

(71) Applicant: Sprint Communications Company L.P., Overland Park, KS (US)

(72) Inventors: Anuj Sharma, Broadlands, VA (US); Ramesh Kumar Golla, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 654 days.

(21) Appl. No.: 15/399,798

(22) Filed: Jan. 6, 2017

(51) Int. Cl.
*G06F 16/21* (2019.01)
*H04W 12/06* (2009.01)
*G06F 16/23* (2019.01)
*G06F 16/176* (2019.01)

(52) U.S. Cl.
CPC ........ *G06F 16/214* (2019.01); *G06F 16/1767* (2019.01); *G06F 16/1774* (2019.01); *G06F 16/2343* (2019.01); *H04W 12/06* (2013.01)

(58) Field of Classification Search
CPC ............... G06F 16/214; G06F 16/2343; G06F 16/1767; G06F 16/1774
See application file for complete search history.

(56) References Cited

U.S. PATENT DOCUMENTS

| | | | |
|---|---|---|---|
| 7,310,650 B1 * | 12/2007 | Felsted | G06F 16/289 |
| 7,730,258 B1 * | 6/2010 | Smith | G06F 3/0622 |
| | | | 711/114 |
| 7,920,529 B1 * | 4/2011 | Mahler | H04W 8/04 |
| | | | 370/338 |
| 8,131,671 B2 * | 3/2012 | Mullen | G06F 16/119 |
| | | | 707/610 |
| 8,341,631 B2 * | 12/2012 | Havemose | G06F 8/62 |
| | | | 718/100 |
| 8,539,488 B1 * | 9/2013 | Havemose | G06F 11/1469 |
| | | | 718/100 |
| 9,596,302 B2 * | 3/2017 | Salle | G06F 9/4856 |
| 9,858,200 B1 | 1/2018 | Griffin et al. | |

(Continued)

OTHER PUBLICATIONS

FAIPP Pre-Interview Communication dated Apr. 19, 2018, U.S. Appl. No. 15/162,262, filed May 23, 2016.

(Continued)

*Primary Examiner* — Jeff A Burke

(57) ABSTRACT

A method of migrating a data store of wireless communication subscriber data from a source data store system to a target data store system. The method comprises receiving a provisioning request by a computer system, looking up and revising a data entry in the source data store system based on the provisioning request, copying and creating a reference to the revised data entry in the target data store system, and changing the reference in the source data store system to reference empty memory by the computer system. A second portion of data migration comprising creating a list of data entries, softlocking each data entry, reading and copying each data entry to the target data store system, creating a reference to the data entry, changing the reference in the source data store system to reference empty memory, and releasing the softlock by the computer system.

20 Claims, 8 Drawing Sheets

(56) References Cited

U.S. PATENT DOCUMENTS

| | | | |
|---|---|---|---|
| 10,083,199 B1* | 9/2018 | Sharma | G06F 3/0619 |
| 2008/0172670 A1 | 7/2008 | Corrigan et al. | |
| 2012/0066389 A1* | 3/2012 | Hegde | G06F 9/4856 |
| | | | 709/226 |
| 2014/0136502 A1 | 5/2014 | Mohamed et al. | |
| 2015/0139407 A1* | 5/2015 | Maguire | H04M 3/2227 |
| | | | 379/22.03 |
| 2015/0370505 A1* | 12/2015 | Shuma | G06F 3/0647 |
| | | | 711/165 |
| 2016/0011648 A1* | 1/2016 | Zhang | H04L 43/0817 |
| | | | 713/323 |
| 2016/0098438 A1 | 4/2016 | Eberlein et al. | |
| 2017/0192714 A1* | 7/2017 | Ray | G06F 11/108 |
| 2017/0272515 A1* | 9/2017 | Sanderson | H04L 67/1095 |
| 2019/0174299 A1* | 6/2019 | Ullah | H04W 8/24 |

OTHER PUBLICATIONS

Notice of Allowance dated Jun. 7, 2018, U.S. Appl. No. 15/162,262, filed May 23, 2016.
Zhengyu He, et al., "On the Performance of Commit-Time-Locking Based Software," IEEE International Conference on High Performance Computing and Communications, p. 108-187 (Year: 2009).
Sharma, Anuj, et al., "Data Migration in Active Data Store," filed May 23, 2016, U.S. Appl. No. 15/162,262.

\* cited by examiner

DATA MIGRATION BETWEEN DIFFERENT LIGHTWEIGHT DIRECTORY ACCESS PROTOCOL (LDAP) BASED WIRELESS COMMUNICATION SUBSCRIBER DATA STORES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A very large data store system may contain data that is stored on a plurality of separate disk drives. Such disk drives are sometimes referred to as back end data storage. Client applications may read and write the data in the data store systems, and the data store systems may map these access requests to the appropriate data stores. It may be desirable to replace or add one or more additional data stores and redistribute or migrate some of the data entries from legacy data stores to the one or more additional or new data stores. The added new data store systems may have desirable new technology to better and more efficiently serve client applications. Sometimes data stores may be decommissioned and/or removed from service as the device exceeds an expected service life or as the device begins to experience failures. In case of data store decommissioning or removal, the data entries on the subject data store may desirably be migrated to other data stores.

SUMMARY

In an embodiment, a method of migrating a data store of wireless communication subscriber data from a first data store system to a second data store system while continuing to handle requests to authenticate subscribers in the data store, where the second data store system is different from the first data store system, is disclosed. The method comprises receiving during a first portion of a subscriber data migration a plurality of subscriber data provisioning requests by a computer system, wherein each provisioning request comprises a reference to a wireless communication subscriber data entry and a provisioning content. The method further comprises, in response to each provisioning request, looking up a wireless communication subscriber data entry by the computer system in the first data store system based on the reference of the provisioning request, revising the wireless communication subscriber data entry by the computer system in the first data store system based on the provisioning content of the provisioning request, copying a revised wireless subscriber data entry identified by the reference by the computer system to the second data store system, creating a reference to the revised wireless subscriber data entry copied to the second data store system, changing the reference to the wireless communication subscriber data entry in the first data store system to reference empty memory, and during a second portion of the subscriber data migration, creating a list of wireless communication subscriber data entries to be migrated from the first data store system to the second data store system by the computer system, where the list of data entries to be migrated excludes data entries that are migrated during the first portion of the subscriber data migration. The method further comprises for each wireless communication subscriber data entry in the list, setting a softlock on the wireless communication subscriber data entry in the first data store system by the computer system, reading the wireless communication subscriber data entry in the first data store system by the computer system, copying the wireless communication subscriber data entry read in the first data store system by the computer system into the second data store system, creating a reference to the wireless subscriber data entry copied to the second data store system by the computer system, changing the reference to the wireless subscriber data entry in the first data store system to reference empty memory by the computer system, and releasing the softlock on the wireless communication subscriber data entry in the first data store by the computer system, where if an attempt to write the wireless communication subscriber data entry in the first data store system that has a softlock set occurs, any of the steps copying the data entry read into the second data store system and of creating a reference to the data entry are backed out of the second data store system.

In another embodiment, a method of migrating a data store of wireless communication subscriber data from a first data store system to a second data store system, where the second data store is different from the first data store system is disclosed. The method comprises creating by a computer system a list of wireless communication subscriber data entries to be migrated from the first data store system to the second data store system, setting a softlock on a wireless communication subscriber data entry in the first data store system by the computer system, where the wireless communication subscriber data entry is identified in the list, after setting the softlock, receiving a provisioning request that comprises a reference to the wireless communication subscriber data entry and a provisioning content, and in response to receiving the provisioning request, rolling back a transaction on the second data store. The method further comprises after rolling back the transaction, looking up a wireless communication subscriber data entry by the computer system in the first data store system based on the reference of the provisioning request, revising the wireless communication subscriber data entry by the computer system in the first data store system based on the provisioning content of the provisioning request, copying a revised wireless subscriber data entry identified by the reference by the computer system to the second data store system, creating a reference to the revised wireless subscriber data entry copied to the second data store system, and changing the reference to the wireless communication subscriber data entry in the first data store system to reference empty memory.

In yet another embodiment, a method of migrating a data store of wireless communication subscriber data from a first data store system to a second data store system while continuing to handle requests to authenticate subscribers in the data store, where the second data store is different from the first data store system is disclosed. The method comprises creating by a computer system a list of wireless communication subscriber data entries to be migrated from the first data store system to the second data store system, setting a softlock on a wireless communication subscribers data entry in the first data store system by the computer system, reading the wireless communication subscriber data entry in the first data store system by the computer system, copying the wireless communication subscriber data entry read in the first data store system by the computer system into the second data store system, and creating a reference to the wireless subscriber data entry copied to the second data store system by the computer system, before committing the wireless communication subscriber data entry in the second data store system, receiving an access request that comprises a reference to the wireless communication subscriber data entry, in response to receiving the access request, rolling back a transaction of copying the wireless communication subscriber data entry into the second data store system and the creation of the reference to the data entry copied to the second data store. The method further comprises after rolling back the transaction and completing the access request, looking up the wireless communication subscriber data entry by the computer system in the second data store system, looking up the wireless communication subscriber data entry by the computer system in the first data store system, if the data entry in the first data store system matches the data entry in the second data store system, changing the reference to the wireless communication subscriber data entry in the first data store system by the computer system to reference empty memory, and if the data entry in the first data store system does not match the data entry in the second data store system, setting a softlock on the wireless communication subscriber data entry in the first data store system by the computer system, reading the wireless communication data entry in the first data store system by the computer system, copying the wireless communication subscriber data entry read in the first data store system by the computer system into the second data store system, creating a reference to the wireless subscriber data entry copied to the second data store system by the computer system, changing the reference to the wireless communication subscriber data entry in the first data store system to reference empty memory by the computer system, and releasing the softlock on the wireless communication subscriber data entry in the first data store by the computer system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
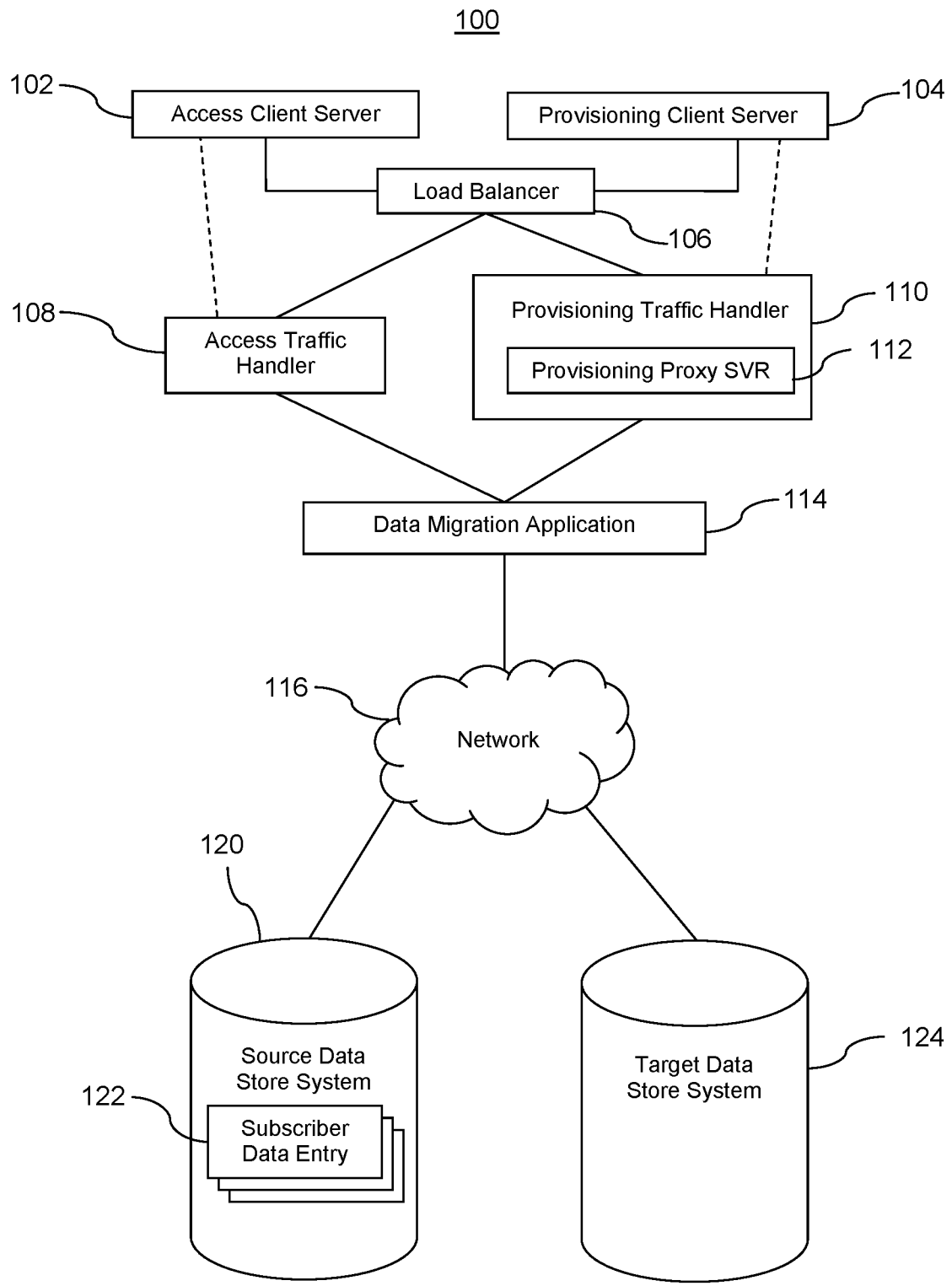
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Data store systems may be used to store large amounts of electronic information referred to as data. Copying or migrating data from a first data store system to a second data store system may pose a variety of challenges. These challenges may occur when the first and second data stores are developed by different vendors, and the first data store may not be compatible with the second data store. Migrating data on one data store system to a second data store system may be desirable in the case of increasing performance for a wireless communication service provider. Increasing performance may result in enhancing the wireless service user experience and increasing confidence in a secure data store system. The present disclosure teaches methods of migrating data from one data store system to another data store system without interfering with client applications accessing the data.

One of the challenges of data migration is migrating data from one data store system to another data store system that are developed or produced by different vendors with incompatible design platforms. Migrating data to another platform may be desired while transitioning from one generation of platform to a different generation of platforms. These incompatible design platforms include implementations to the data store system that are unique to each vendor. Another of the challenges is to seamlessly provide access to the data in the data store for client applications during the data migration activity, for example, to migrate the data in a way that is transparent to client applications and does not result in a failure or malfunction of the client application. The difficulty of these challenges can be increased by scale factors. For example, in an embodiment, the data migration application acts upon a large data store that comprises in excess of 100 million data entries.

In an embodiment, the data migration application migrates data from one or more of a first data store system, referred to as a source data store system, to one or more of another data store system, referred to as a target data store system. It will be appreciated that the data migration method is able to migrate data from one source data store system to one target data store system, from one source data store system to a plurality of target data store systems, from a plurality of source data store systems to a plurality of target data store systems, and/or from a plurality of source data store systems to a single target data store system. In some cases, one or more of the target data store systems may be new data stores that are being added to the data store systems.

In an embodiment, the subscriber data entries in the data store systems are structured as light-weight directory access protocol (LDAP) tree objects. An access client server houses access clients that frequently read and update subscriber data entries, and a provisioning client server houses provisioning clients that frequently read and write subscriber data entries. A load balancer redirects the access clients and provisioning clients to the data migration application via an access traffic handler and a provisioning traffic handler. The data migration application executes on one or more computer systems to migrate subscriber data entries from one or more source data store systems to one or more target data store system, while the subscribers are actively reading and writing entries to the subscriber data entries.

In an embodiment, a provisioning request may be structured as a non-LDAP protocol such as an extensible telephony markup language (XTML), an extensible markup language (XML), a Simple Object Access Protocol language (SOAP), or any other non-LDAP software protocol. Before entering the data store system, the provisioning request is converted into an LDAP provisioning request structure by a provisioning proxy server. The conversion into a common LDAP structure allows for a compatible provisioning interface into the LDAP subscriber data entries in the data store system. The source and target data store systems may also include geographically redundant data store systems. These redundant data store systems have data replications of the primary data store systems they replicate. It may be desired to have redundant data store systems in the case a data store system breaks or fails. It may also be desired to have redundant data store systems in order to optimize the data store systems for faster access. After a data migration from a primary source data store system to a primary target data store system, the primary target data store system will replicate the migrated data entries to the remote redundant target data store systems. In an embodiment, the references to the subscriber data entries in the redundant source data store systems are also updated to reference empty memory after migration.

In an embodiment, the data migration process triggered by receiving a provisioning request by a wireless communication subscriber may be referred to as a first data migration mode. A provisioning request comprises reference to a wireless communication subscriber data entry and a provisioning content. For example, a provisioning content may include a wireless communication subscriber changing the features of a wireless communication subscriber account, which may entail adding new features, deleting existing features, and/or updating a profile to the subscriber account. The wireless communication subscriber accounts are stored in the source data store as data entries. The first data migration mode comprises, upon receiving a subscriber data provisioning request comprising a reference to a wireless communication subscriber data entry and a provisioning content by a computer system, looking up a wireless communication subscriber data entry in the source data store system based on the reference of the provisioning request, revising the subscriber data entry in the source data store system based on the provisioning request, copying the revised subscriber data entry to the target data store system, creating a reference to the revised subscriber data entry copied to the target data store system, and changing the reference of the subscriber data entry in the source data store system to reference empty memory. In an embodiment, before the computer system looks up a subscriber data entry in the source data store system, a transaction may be initiated, such as an LDAP transaction. Before the revised subscriber data entry is copied to the target data store system, a second transaction may be initiated, such as an LDAP transaction.

A reference to a wireless communication subscriber data entry may be referred to as an alias by those skilled in the art. Aliases are a form of indirect addressing and may be used to access data entries in a data store system. A subscriber account may have multiple aliases associated with that subscriber account. In an embodiment, the original data entry is not deleted from the data store in the case of a migration failure. The original data entry can then be easily found by a computer system and all changes may be quickly reversed to the original state of the data store system. Upon migration of a data entry, the reference in the source data store system is merely changed to reference empty memory. The information of the data entry still remains in the source data store system. If a change is made to a subscriber data entry in the target data store system after migration, the data migration application may look up and update the subscriber data entry in the source data store system. The subscriber data entry in the source data store system is also updated in the case a roll-back is performed.

The data migration application initiates a second data migration mode. The second data migration mode may migrate data entries as a background data migration mode while the first data migration mode (e.g., while migrating a plurality of subscriber data entries that were modified pursuant to a provisioning operation while the first data migration mode was activated) is migrating subscriber data from the source data store system to the target data store system. Said in other words, the second data migration mode may execute as a background process while the first data migration mode executes as an event-driven foreground process (e.g., driven by provisioning events). The second data migration mode comprises the data migration application creating a list of wireless communication subscriber data entries, excluding the data entries that have already been migrated using the first data migration mode, to be migrated from the source data store system to the target data store system. The second data migration mode further comprises the data migration application using a softlocking mechanism on each subscriber data entry in the list (e.g., engaging a softlock on each data entry in the list, taken one at a time not all at the same time), reading the subscriber data entry in the source data store system, copying the subscriber data entry in the source data store system to the target data store system, creating a reference to the subscriber data entry copied to the target data store system, changing the reference to the subscriber data entry in the source data store system to reference empty memory, and releasing the softlock of the subscriber data entry in the source data store system.

In an embodiment, before the computer system softlocks a subscriber data entry, a transaction may be initiated, such as an LDAP transaction. Before reading the subscriber data entry in the source data store system, an LDAP transaction may be opened on the source data store system. Before copying the subscriber data entry to the target data store system, a different LDAP transaction may be opened on the target data store system. The releasing of the softlock may be accomplished automatically by an LDAP framework or data management system when the LDAP transaction on the source data store system is committed.

In an embodiment, a softlock is a lock on a subscriber data entry that releases and rolls back an opened LDAP transaction of a subscriber data entry in the case an interruption to the data migration is detected by the data migration application. The softlock functionality may be provided as a function, service, or utility of a software application, for example by an LDAP framework or data management system. The interruption may be a provisioning or access request on the subscriber data entry in the data store system initiated by a wireless communication subscriber. The subscriber data entry is rolled back to its original pre-migration state on the source data store system. The softlock releases the subscriber data entry and allows the provisioning or access request by the client to be completed. A softlock allows for a subscriber or a client application to access the subscriber data entry without an unexpected interruption or denial of wireless communication service. In an embodiment, a softlock is automatically released by the data migration application when the subscriber data entry is committed to the target data store system.

In an embodiment, the subscriber data entries are migrated separately by the data migration application from the source data store system to the target data store system. The data migration application softlocks, migrates, and releases the softlock on one data entry in the list of subscriber data entries before softlocking, migrating, and releasing the softlock on the next data entry in the list. When operating in the second data migration mode, the data migration application may execute a plurality of concurrent migration threads, wherein each data migration thread migrates one subscriber data entry, in parallel in order to reduce the time of migrating the list of subscriber data entries from the source data store system to the target data store system. For example, the data migration application may execute 10 separate parallel threads of execution, 50 separate parallel threads of execution, 100 separate parallel threads of execution, or any other number of separate parallel threads of execution.

When a data entry is locked by a softlocking mechanism, the data migration application will roll back its current data entry migration when it receives a provisioning request referencing the data entry. Rolling back a data entry entails deleting the in-progress migration of the data entry to the target data store system, leaving the data entry in the source data store system in its original pre-migration state. A successful rollback indicates that the data entry has been deleted from the target data store system. The data migration application will update the rolled-back data entry by revising the data entry based on the provisioning request and migrate it to the target data store system after the data entry has been revised. The data migration process does not affect the wireless communication subscriber, and the provisioning request is successful.

The computer system may copy the wireless communication subscriber data entry from the source target system to a shadow journal of the target memory device. A shadow journal may be conceptualized as a portion of the memory that is not exposed to or accessible to the subscriber or front end applications until the data migration transaction has been committed. In an embodiment, the data migration of each subscriber data entry from a source data store system to a target data store system by the computer system is an atomic transaction. An atomic transaction means that the migration of the data entry is performed in such a way that a multi-step migration process is either completely performed to realize a new self-consistent state of the data store system or the migration is not performed and any in-progress steps are rolled-back, leaving the data store system and the subject entry in the state it was in before the start of the atomic transaction.

In an embodiment, the first data migration mode may be used to migrate data entries from a source data store system to a target data store system in order to gain confidence in the data migration process. The first data migration mode migrates data entries relatively slowly in comparison to the second data migration mode. The first data migration mode may be implemented for a predefined period of time such as one week, two weeks, three weeks, or any other period of time before the data migration application begins to migrate data entries according to the second data migration mode. After confidence in the data migration application has been gained, the second data migration mode may be initiated. The second data migration mode migrates data from the source data store system to the target data store system at a higher rate than the first data migration mode. The source data store system may contain in excess of 100 million subscriber data entries to be migrated to the target data store system.

In an embodiment, during the second data migration mode, the computer system may receive an access request that comprises a reference to the wireless communication subscriber data entry before committing the subscriber data entry in the target data store system. The access request may be a network authentication performed by a cell site on a mobile communication device. In this case, the data migration application releases the softlock on the data entry in the source data store system, rolls back a transaction of copying the data entry into the target data store system, and completes the access request on the source data store system. After completing the access request, the data migration application first looks up the subscriber data entry in the target data store system, and if it does not find the targeted subscriber data entry, the data migration application looks up the subscriber data entry in the source data store system and migrates the data entry according to the second data migration mode. If the subscriber data entry in the source data store system matches the subscriber data entry in the target data store system, then the data migration application will change the reference to the subscriber data entry in the source data store system to reference empty memory. However, if the subscriber data entry in the source data store system does not match the subscriber data entry in the target data store system, then the data migration application will migrate the subscriber data entry in the source data store system to the target data store system. Upon completion of the migration of all the subscriber data entries from a source data store system to a target data store system, the source data store systems may be repurposed for other data storage uses or decommissioned and/or removed from service once it is deemed that a roll-back is not desired.

In an embodiment, a front-end application may request to access a subscriber data entry stored in the data store system via a reference to the subscriber data entry. The application may be initially configured to first look up the reference to the subscriber data entry in the source data store system. If the application fails to find the reference to the subscriber data entry in the source data store system, or if the look up returns empty memory, the application is configured to then look up the reference to the subscriber data entry in the target data store system, where the application finds the referenced subscriber data entry. The front-end application configuration may later be changed to first look up the reference to the subscriber data entry in the target data store system. Then, if the reference to the subscriber data entry is not found in the target data store system, the application will look up the reference to the subscriber data entry in the source data store system.

The change in configuration of the front-end application may reduce the number of failures and the time duration for the application to look up the reference to the subscriber data entry. The change in configuration may be automatically applied after a predefined threshold of data entries in the list of data entries has been migrated. For example, the data migration application may adopt this method after more than 50%, after more than 55%, after more than 60%, or after any other predefined threshold of the subscriber data entries in the migration list have been migrated to the target data store system. A user, such as a system administrator, may also manually apply the change in configuration to the application at any desired time.

The data migration system described above, and described in further detail below, is inextricably tied to computer technology because of the large volume of electronic data that is involved and the ongoing, high rate access to this electronic data by wireless communication subscribers. The data migration system is an improvement of existing computer technology because it speeds the process of data entry migration significantly while still allowing access to the stored data by applications rather than shutting down access to the stored data for an extended maintenance window. In an embodiment, the data migration system may be applied to a large data store of many wireless communication subscriber data entries. The data migration system ensures that all wireless communication subscriber data entries are successfully updated and migrated to the target data store system. The data store systems may store upwards of 150 million wireless communication subscriber data entries and these may be accessed at a high frequency to authenticate network access requests by mobile communication devices to receive wireless communication service. The data migration system taught herein can support migrating the large numbers of subscriber data entries without interrupting access to the data entries, which may result in a subscriber being wrongfully denied wireless communication service.

Turning now to FIG. 1, a system 100 is described. In an embodiment, the system 100 comprises an access client server 102 that services access requests and a provisioning client server 104 that services provisioning requests. The access and provisioning requests may come from a cell site of a wireless communication system and an operator provisioning system, respectively. The access client server 102 and the provisioning client server 104 are associated with a load balancer 106. The load balancer 106 distributes the access requests from the access client server 102 to the access traffic handler 108 and the provisioning requests from the provisioning client server 104 to the provisioning traffic handler 110.

An access request may be an authentication or authorization of a wireless communication subscriber in response to a request for wireless communication service. For example, a wireless communication subscriber may request to originate a phone call or to conduct a data session pursuant to browsing the Internet via the cell site. A provisioning request may be a wireless communication subscriber requesting to change a feature on a wireless communication account belonging to said subscriber. Changing a feature may include adding, deleting, or modifying features on an account. For example, a wireless communication subscriber may request to increase a data utilization limit on the account. The provisioning traffic handler 110 comprises a provisioning proxy server 112. The data migration application 114 interacts with both the access traffic handler 108 and the provisioning traffic handler 110 during the data migration process.

The system 100 further comprises a network 116 and a source data store system 120. The network 116 comprises one or more public networks, one or more private networks, or a combination thereof. The source data store system 120 comprises a plurality of subscriber data entries 122. In an embodiment, the data store systems 120 are implemented as a light-weight directory access protocol (LDAP) data store, and the provisioning proxy server 112 converts a non-LDAP structured provisioning request into an LDAP structured provisioning request. For example, the provisioning proxy server 112 may convert an extensible telephony markup language (XTML) structured provisioning request to an LDAP structured provisioning request. It is understood that the provisioning proxy server 112 may convert any non-LDAP structured provisioning request and is not only limited to converting an XTML structured provisioning request.

Occasionally, it may be desirable to replace a source data store system 120 with a target data store system 124. The target data store system 124 may be added in the case of new and improved technology of data store systems, which may be beneficial for reasons including but not limited to increased performance, saved money, increased confidence in a secure storage platform. The target data store system 124 may be a new technology, a different vendor, or somehow different from the source data store system 120. A vendor of a source data store system 120 may be different than a vendor of a target data store system 124. Thus, the source data store system 120 and the target data store system 124 may have incompatible design platforms that include implementations to the data store system that are unique to each vendor. The incompatible design platforms of the data store systems may cause difficulty in migrating data entries 122 from the source data store system 120 to the target data store system 124. It is understood that when adding target data store systems 124 one, two, or more than two of a target data store system 124 may be added at about the same time. Adding a target data store system 124 is associated with moving or migrating at least some subscriber data entries 122 from the source data store system 120 to the target data store system 124. In some contexts, the data store system from which subscriber data entries 122 are moved may be referred to as a source data store system, and the data store system to which entries 122 are moved may be referred to as a target data store system.

While the teachings of this disclosure are general and may apply to any distributed data store, in an embodiment, the source data store system 120 stores tens of millions of entries 122 that represent wireless communication service subscriber accounts. In this embodiment, the access traffic handler 108 may access the entries 122 to complete access requests from the access client server 102. In this embodiment, the provisioning traffic handler 110 may revise the entries 122 to complete provisioning requests from the provisioning client server 104. The data migration application 114 is able to migrate one or more of an entry 122 from one or more source data store systems to one or more target data store systems. The data migration application 114 may be executed by a computer system. Computer systems are describer further hereinafter.

The data migration application 114 may migrate many entries 122 from source data store systems to target data store systems. For example, the data migration application 114 may be tasked with migrating about 10 million, about 15 million, about 20 million, or some other number of data entries 122 from source data store system to target data store system. The data migration application 114 may migrate an entry 122 from a source data store system to a target data store system in an atomic transaction. As used herein, an atomic transaction means that the migration of the data entry 122 is performed in such a way that a multi-step migration process is either completely performed to realize a new self-consistent state of the source data store system 120 or the migration is not performed and any in-progress steps are rolled-back, leaving the source data store system 120 and the subject entry 122 in the state it was in before the start of the atomic transaction. The data migration application 114 may migrate data entries 122 in a plurality of concurrent atomic transactions, wherein each atomic transaction migrates one data entry 122.

A reference to a data entry 122 may be referred to as an alias. A plurality of aliases may map to or reference the same data entry 122. For example, three or more different aliases may map to or reference the same data entry 122. For example, five or more different aliases may map to or reference the same data entry 122. For example, ten or more different aliases may map to or reference the same data entry 122. For example, twelve or more different aliases may map to or reference the same data entry 122. In the case of a wireless communication subscriber data entry 122, the different aliases referencing the same data entry 122 may be associated with different handles or indexes to the same data entry 122. For example, the data entry 122 may be referenced by a first alias based on a phone number associated with the data entry 122; the data entry 122 may be referenced by a second alias based on a first and last name of a subscriber associated with the data entry 122; the data entry 122 may be referenced by a third alias based on a mobile equipment identity (MEID) associated with the data entry 122; the data entry 122 may be referenced by a fourth alias based on an arbitrary subscriber identity number assigned to the subscriber by the wireless communication service provider that is associated with the data entry 122; and so on.

In an embodiment, the data migration application 114 migrates data entries 122 according to a first data migration mode. According to the first data migration mode, the data migration application 114 is triggered to migrate data after receiving a provisioning request on a data entry 122. A provisioning request comprises a reference to a wireless communication subscriber data entry 122 and a provisioning content. The data migration application 114 looks up a data entry 122 in the source data store system 120 based on the reference of the provisioning request. Then, the data migration application 114 revises the data entry 122 based on the provisioning content of the provisioning request and copies the revised data entry 122 to the target data store system 124. The data migration application 114 creates a new reference for the revised data entry 122 for the target data store system 124 and then changes the reference for the original data entry 122 to reference empty memory in the source data store system 120. Before the data migration application 114 looks up the data entry 122, a transaction may be initiated, such as an LDAP transaction. In an embodiment, the original data entry 122 is not deleted from the data store 120 in the case of a migration failure. The original data entry 122 can then be easily found by a computer system and all changes may be quickly reversed to the original state of the source data store system 120.

In an embodiment, a front-end application may request to access the data entry 122 by a reference to the data entry 122. The front-end application may be initially configured to look up the reference to the data entry 122 in the source data store system 120. If the data entry 122 has been successfully migrated to the target data store system 124, the look up would return an empty memory result, thus failing to find the data entry 122 in the source data store system 120. Upon failure, the front-end application may be configured to look up the reference to the data entry 122 in the target data store system 124. The front-end application configuration may be switched to first look up the reference to the data entry 122 in the target data store system 124 after a predefined threshold of data entries 122 have been migrated to the target data store system 124. This predefined threshold may be after 50%, after 55%, after 60%, or after any other predefined threshold of data entries 122 have been migrated to the target data store system 124. If the front-end application fails to find the reference to the data entry 122 in the target data store system 124, it then looks up the reference to the data entry 122 in the source data store system 120. The application configuration may be switched automatically after the predefined threshold of data entries 122 have been migrated, or it may be switched manually, such as by a network administrator.

Upon completion of the first data migration mode, the data migration application 114 initiates a second data migration mode. The second data migration mode may be initiated after confidence in the first data migration mode has been gained. This may be after a predetermined time of implementation of the first data migration mode such as after 1 week, after 2 weeks, after 1 month, or after any other predetermined time of implementation of the first data migration mode. In the second data migration mode, the data migration application 114 creates a list of data entries 122 to be migrated from the source data store 120 to the target data store 124 excluding those that have already been migrated based on provisioning requests. During the migration of the list of data entries 122, the data migration application 114 sets a softlock on and reads each data entry 122 in the list. The data migration application 114 sets a softlock on each data entry 122 individually. In an embodiment, before the data migration application 114 sets a softlock on the data entry 122, a transaction may be initiated, such as an LDAP transaction.

If the access client server 102 receives an access request from a wireless communication subscriber while the data entry 122 is in a softlock state, the data migration application 114 will be notified that a subscriber is attempting to access the data entry 122. In an embodiment, the data migration application 114 will suspend the on-going migration activities on the subject entry 122 and release the softlock and the subscriber will be able to access the requested entry 122 without experiencing a delay or interruption. If the data migration application 114 is not interrupted, it copies the data entry 122 in the source data store 120 and creates a reference to the data entry 122 copied to the target data store system 124. The data migration application 114 then changes the reference to the data entry 122 copied to the target data source system 124 before releasing the softlock on the data entry 122 in the source data store system.

The data migration application 114 migrates each data entry 122 independently in a thread. A thread involves the data migration application 114 softlocking one data entry 122, reading the data entry 122, copying the data entry 122, creating a reference to the data entry 122 in the target data store system 124, changing the reference to the data entry 122 in the source data store system 120, and releasing the softlock on the data entry 122 in the source data store system 120 before terminating. A thread may be implemented as an atomic transaction by the data migration application 114. The data migration application 114 may migrate multiple concurrent threads of data entries 122 in parallel from the source data store system 120 to the target data store system 124 in order to reduce the time duration for migrating the list of data entries 122. For example, the data migration application 114 may execute 10 separate parallel threads of execution, 50 separate parallel threads of execution, 100 separate parallel threads of execution, or any other number of separate parallel threads of execution.

In an embodiment, the data migration application 114 receives a provisioning request that comprises a reference to the wireless communication subscriber data entry 122 and a provisioning content while migrating the list of data entries 122 according to the second data migration mode. The softlock set on the data entry 122 in the source data store system 120 notifies the data migration application 114 that a subscriber or an operator provisioning system is attempting to provision a data entry 122, and the data migration application 114 suspends the on-going migration on the data entry 122 and rolls back a transaction of the data entry 122 into the target data store system 124 and creates a reference to the data entry 122 copied to the target data store system 124. Then, based on the data entry reference of the provisioning request, the data migration application 114 looks up the data entry 122 in the source data store system 120 and revises the data entry 122 based on the provisioning content. The revised data entry 122 is then copied to the target data store system 124. A reference is created for revised data entry 122 in the target data store system 124, and the reference for the data entry 122 is changed in the source data store system 120 to reference empty memory.

In an embodiment, while migrating the list of data entries 122 according to the second data migration mode, the data migration application 114 receives an access request that comprises a reference to a wireless communication subscriber data entry 122 before committing the data entry 122 in the target data store system 124. The softlock set on the data entry 122 notifies the data migration application 114 that a request for access from the subscriber has been received and rolls back a transaction of copying the data entry 122 into the target data store system 124 and the creation of the reference to the data entry 122 copied to the target data store 124. A successful roll back ensures that the data entry 122 and the reference to the data entry 122 are deleted from the target data store 124. The access request is then completed for the data entry 122 without impacting the subscriber. Upon completion of the access request, the data migration application 114 migrates the data entry 122 from the source data store 120 to the target data store 124 according to the second mode of migration. The data migration application 114 may reattempt to migrate the data entry 122 after a certain period of time such as after 500 mS or after any period of time.

In an embodiment, the rollback is unsuccessful, where the data entry 122 and the references to the data entry 122 are not deleted entirely from the target data store 124, the data migration application 114 looks up the data entry 122 in the target data store system 124 and in the source data store system 120. If the two data entries 122 match, then the data migration application 114 changes the reference to the data entry 122 in the source data store system 120 to reference empty memory. If the data entry 122 in the source data store system 120 does not match the data entry 122 in the target data store system 124, then the data migration application 114 will migrate the data entry 122 from the source data store system 120 to the target data store system 124 by setting a softlock on the data entry 122 in the source data store system 120, reading the data entry 122 in the source data store system 120, copying the data entry 122 in the source data store system 120 to the target data store system 124, creating a reference to the data entry 122 copied to the target data store system 124, changing the reference to the data entry 122 in the source data store system 120 to reference empty memory, and releasing the softlock on the data entry 122 in the source data store system 120.

In an embodiment, there may exist geographically redundant source data store systems 120 and target data store systems 124. These geographically redundant data store systems contain identical replicates of data entries 122 but reside in different geographical locations. For example, there may exist three geographically redundant source data store systems 120 and three geographically redundant target data store systems 124. In an embodiment, for each group of geographically redundant data store systems, there is a primary data store system. For example, the data migration application 114 migrates the subscriber data entries 122 from a primary source data store system to the primary target data system. The primary target data store system then replicates the migrated subscriber data entries 122 to its geographically redundant data store systems. The data migration application 144 changes the reference of the subscriber data entries 122 in the primary source data store system to reference empty memory. The primary source data store system then changes the subscriber data entries 122 to reference empty memory in its geographically redundant data store systems.

It is to be remembered that the data migration application 114 may be migrating data entries 122 concurrently, migrating a plurality of data entries 122 from one or more source data store systems to one or more target data store systems. It is important to note that the process of migrating data entries 122 can be said to be performed on a non-interference basis with reference to the on-going use of the source data store system 120 by the wireless communication subscribers devices. It will be appreciated that in some cases it would be impracticable or impossible to render the source data store system 120 out of service for the duration of the migration of tens or millions of data entries 122 to the target data store system 124. For example, in the example use case of a wireless communication service subscriber distributed data store, taking the data store out of service while a massive data entry 122 migration is performed might entail suspending service for tens of millions of wireless communication service subscribers for multiple hours or days. The present disclosure teaches a method that performs such migrations of data entries 122 without interfering with providing normal data access services to wireless communication subscribers.

Figure 2A:
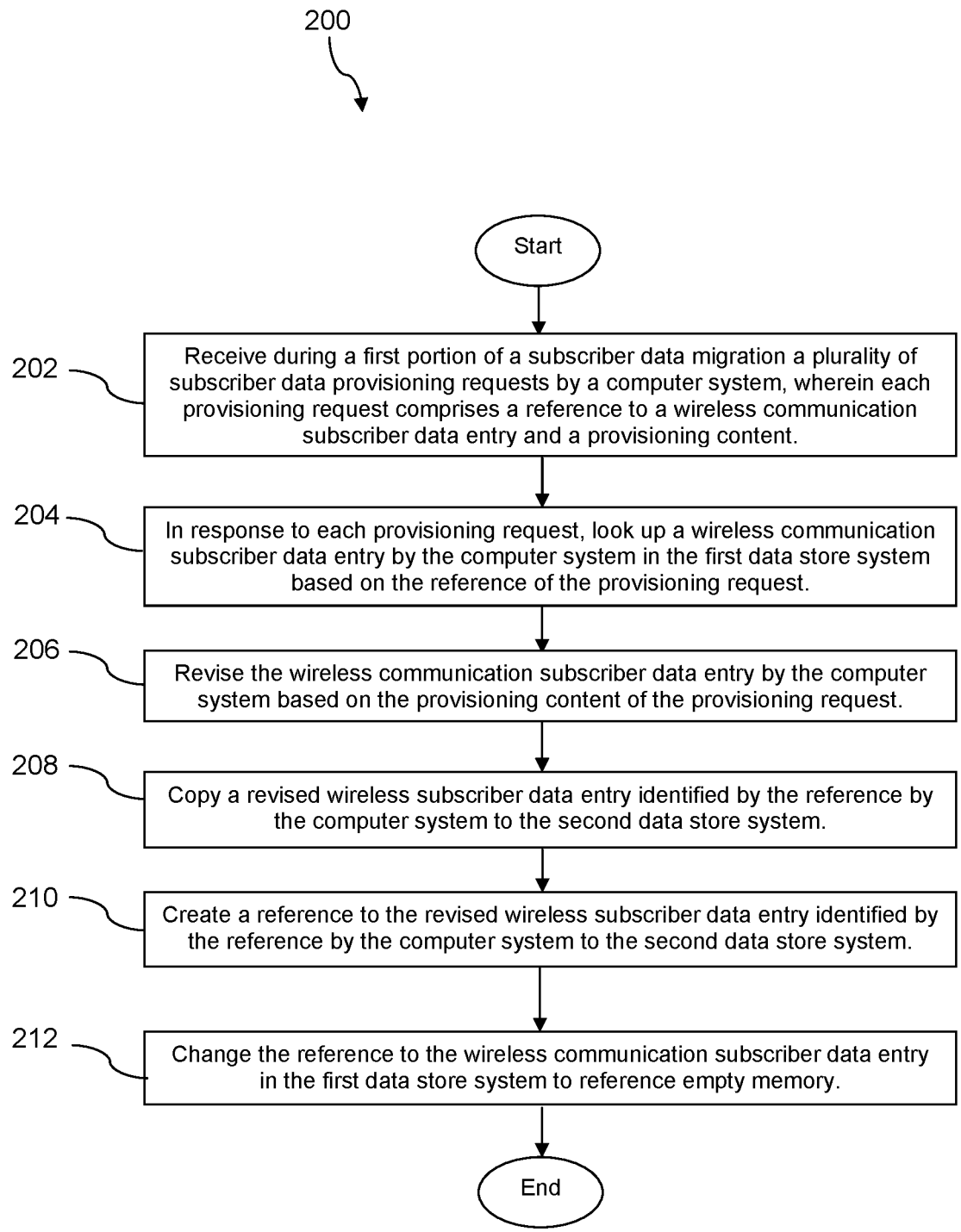
FIG. 2A is a flow chart of a method according to an embodiment of the disclosure.

Turning now to FIG. 2A, a method 200 is described. The method 200 may be used for migrating a data store of wireless communication subscriber data from a source data store system to a target data store system while continuing to handle requests to authenticate subscribers in the data store. The method may be referred to as a first data migration mode. The method may be used to migrate data entries 122 from a source data store system 120 to a target data store system 124. At block 202, a plurality of subscriber provisioning requests is received by a computer system, where each comprises a reference to a wireless communication subscriber data entry and a provisioning content.

At block 204, the computer system looks up the wireless communication subscriber data entry in the source data store system based on the reference of the provisioning request. In an embodiment, before the computer system looks up the data entry in block 204, a transaction may be initiated on the source data store system, such as an LDAP transaction. For example, the reference to the wireless communication subscriber data entry may be a phone number associated with the subscriber account. The computer system may look up the phone number of the wireless communication subscriber in the source data store system. In an embodiment, a softlock on LDAP objects of the data entry may be established before the computer system looks up the data entry in block 204.

At block 206, the data entry is revised by the computer system in the source data source system based on the provisioning content of the provisioning request. For example, the provisioning content may be to add data usage to a mobile device of the wireless communication subscriber. The computer system revises the data entry of the wireless communication subscriber to add usable data to the account. At block 208, the revised data entry is copied by the computer system to the target data store system. In an embodiment, before the revised data entry is copied in block 208, an LDAP transaction may be opened on the target data store system. At block 210, a reference is created to the revised data entry copied to the target data store system. For example, the reference may be created to be the phone number of the wireless communication subscriber of the account. At block 212, the reference to the data entry in the source data store system is changed to reference empty memory. For example, the reference may be changed to an arbitrarily assigned value that does not return a wireless communication subscriber account if a computer system looks up a reference to the wireless communication subscriber data entry in the source data store system. At this point, in an embodiment, the LDAP transaction on the source data store system and the LDAP transaction on the target data store system may be committed. It is understood that committing the LDAP transaction on the source data store system may release a softlock.

Figure 2B:
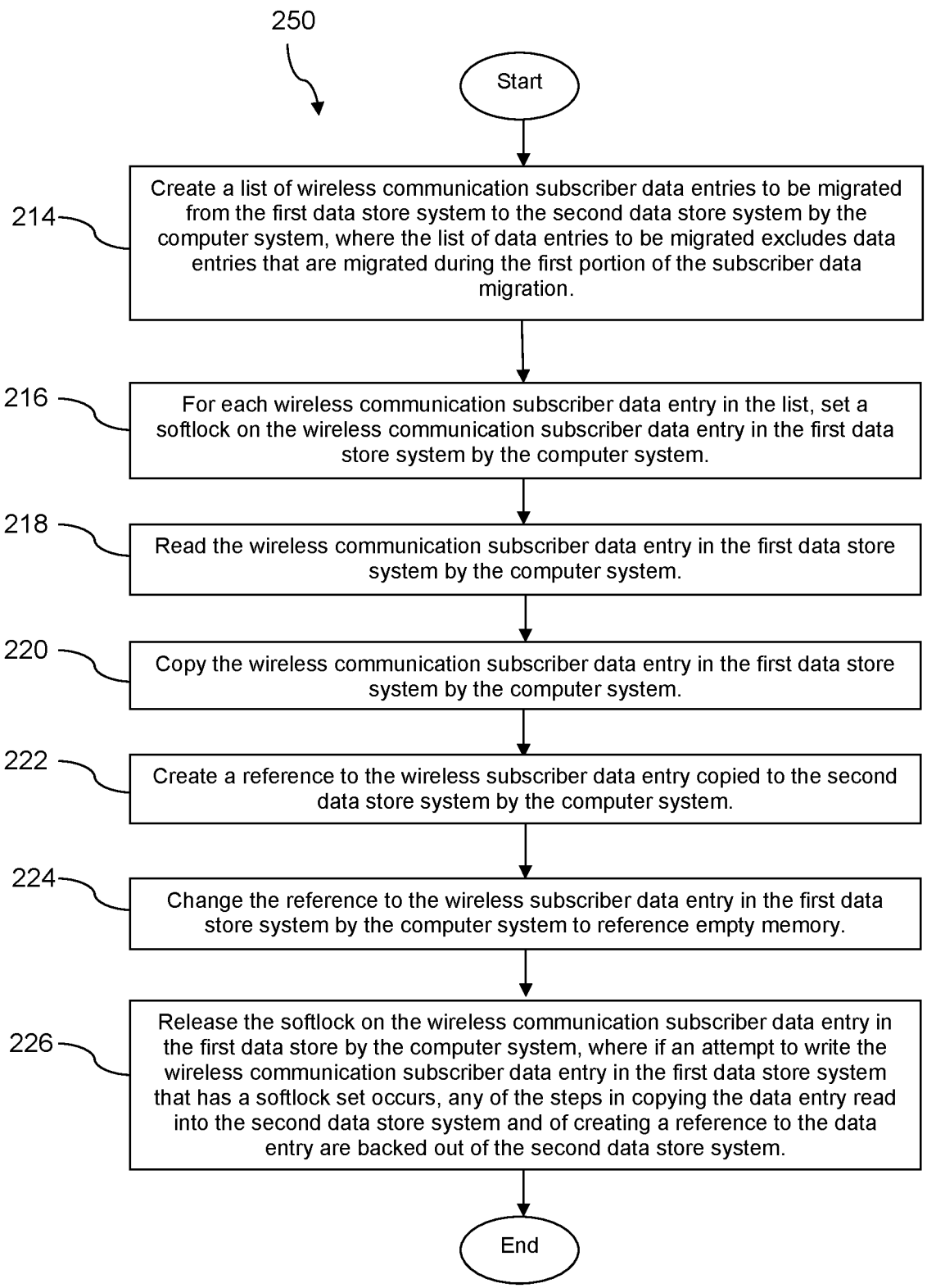
FIG. 2B is a flow chart of a method according to an embodiment of the disclosure.

Turning now to FIG. 2B, a method 250 is described. The method 250 describes a second portion of the method 200 of migrating a data store of wireless communication subscriber data from a source data store system to a target data store system while continuing to handle requests to authenticate subscriber in the data store. The method 250 may be referred to as a second data migration mode, and in an embodiment, the method 250 may occur simultaneously with the first portion of the subscription data migration. At block 214, the computer system creates a list of wireless communication subscriber data entries to be migrated from the source data store system to the target data store system, where the list of subscriber data entries excludes data entries that are migrated during the first portion of the subscriber data migration. At block 216, the computer system separately sets a softlock on each of the wireless communication subscriber on the list in the source data store system. In an embodiment, before the data entry is softlocked in block 216, a second transaction may be initiated, such as an LDAP transaction.

At block 218, the subscriber data entry in the source data store system is read by the computer system. At block 220, the subscriber data entry is copied to the target data store system by the computer system. In an embodiment, the computer system may first copy the subscriber data entry into a shadow journal of the target data store system. At block 222, a reference to the copied subscriber data entry in the target data store system is created by the computer system. At block 224, the reference to the subscriber data entry in the source data store system is changed by the computer system to reference empty memory. This reference is revised in the source data store system (e.g., the reference being changed is itself stored in the source data store system). In an embodiment, the subscriber data entry is not entirely deleted from the source data store system in the case a roll-back is deemed necessary. In an embodiment, if a change is made to a subscriber data entry 122 in the target data store system 124 after migration, the data migration application may look up and update the subscriber data entry 122 in the source data store system 120. The subscriber data entry in the source data store system is also updated in the case a roll-back is necessary.

At block 226, the softlock on the subscriber data entry in the source data store system is released by the computer system, where if an attempt to write the subscriber data entry in the source data store system that has a softlock set occurs, any of the steps of copying the data entry read into the target data store system and of creating a reference to the data entry are backed out of the target data store system.

Figure 3A:
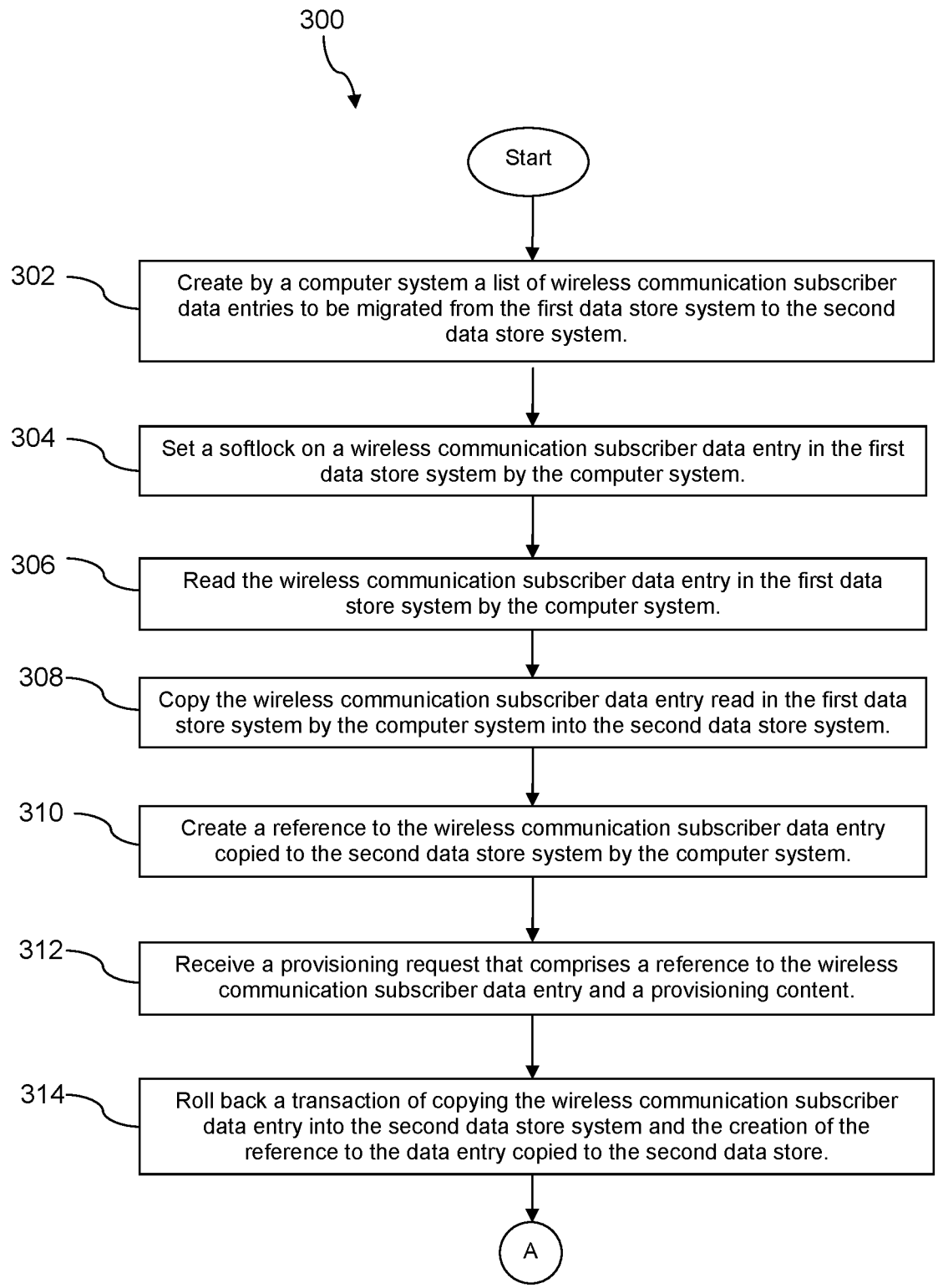
FIG. 3A and FIG. 3B are a flow chart of a method according to an embodiment of the disclosure.
Figure 3B:
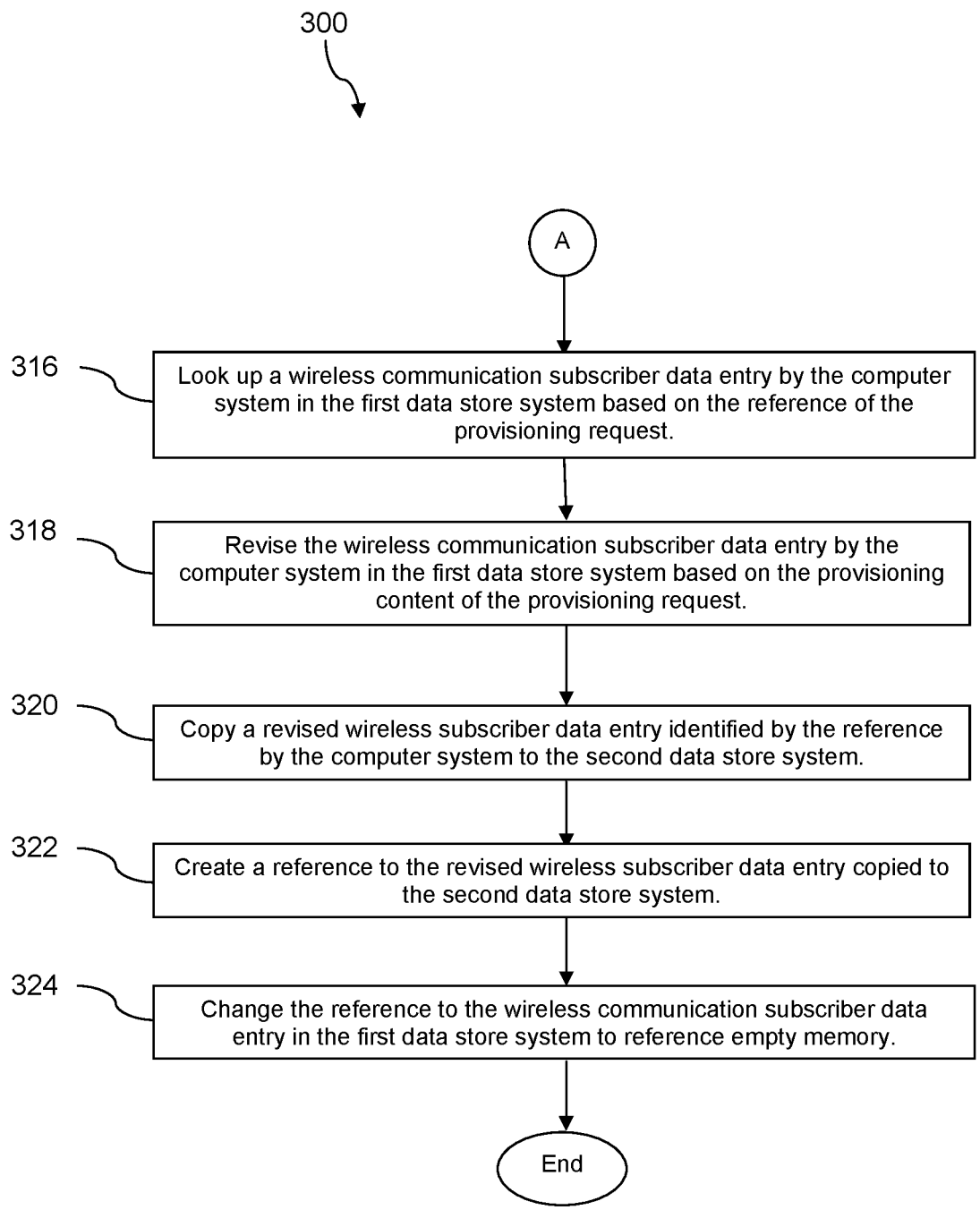

Turning now to FIG. 3A and FIG. 3B, a method 300 is described. The method 300 may be used for migrating a data store of wireless communication subscriber data from a source data store system to a target data store system and receiving a provisioning request while continuing to handle requests to authenticate subscribers in the data store. At block 302, a list of wireless communication subscriber data entries is created by a computer system to be migrated from the source data store system to the target data store system. At block 304, the computer system sets a softlock on a subscriber data entry in the source data store system. A softlock notifies the computer system when a request is being made to access the subscriber data entry. At block 306, the subscriber data entry in the source data store system is read by the computer system. At block 308, the subscriber data entry read in the source data store system is copied by the computer system to the target data store system.

At block 310, a reference to the copied subscriber data entry is created by the computer store system. In an embodiment, the reference to the subscriber data entry may be referred to as an alias. The reference may comprise a first and last name of the wireless communication subscriber, a phone number of the wireless communication subscriber, and/or an arbitrary subscriber identification number assigned to the wireless communication subscriber. At block 312, a provisioning request that comprises a reference to the subscriber data entry and a provisioning content is received before committing the subscriber data entry in the target data store system. In an embodiment, a provisioning content may comprise a wireless communication subscriber requesting to change their subscriber account such as adding new features, deleting current features, or modifying existing features to the referenced wireless communication subscriber account.

At block 314, a transaction of copying the subscriber data entry into the target data store system and the creation of the reference to the data entry copied to the target data store system is rolled back. At block 316, a subscriber data entry is looked up by the computer system in the source data store system based on the reference of the provisioning request. At block 318, the subscriber data entry in the source data store system is revised by the computer system based on the provisioning content in the provisioning request. At block 320, the revised subscriber data entry is copied by the computer system to the target data store system. At block 322, a reference to the revised subscriber data entry copied to the target data store system is created by the computer system. At block 324, the reference to the subscriber data entry in the source data store system is changed to reference empty memory.

Figure 4A:
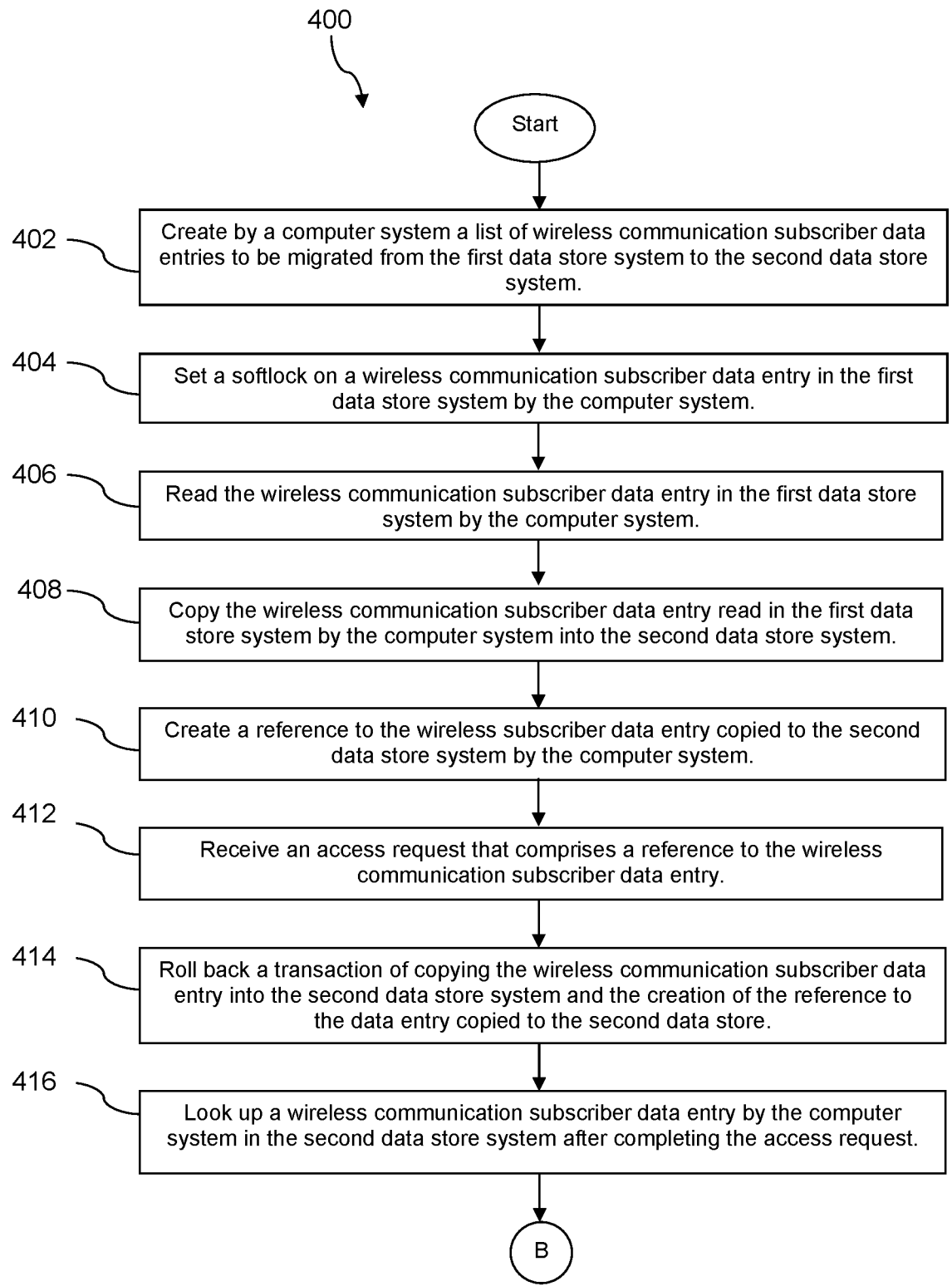
FIG. 4A and FIG. 4B are a flow chart of a method according to an embodiment of the disclosure.
Figure 4B:
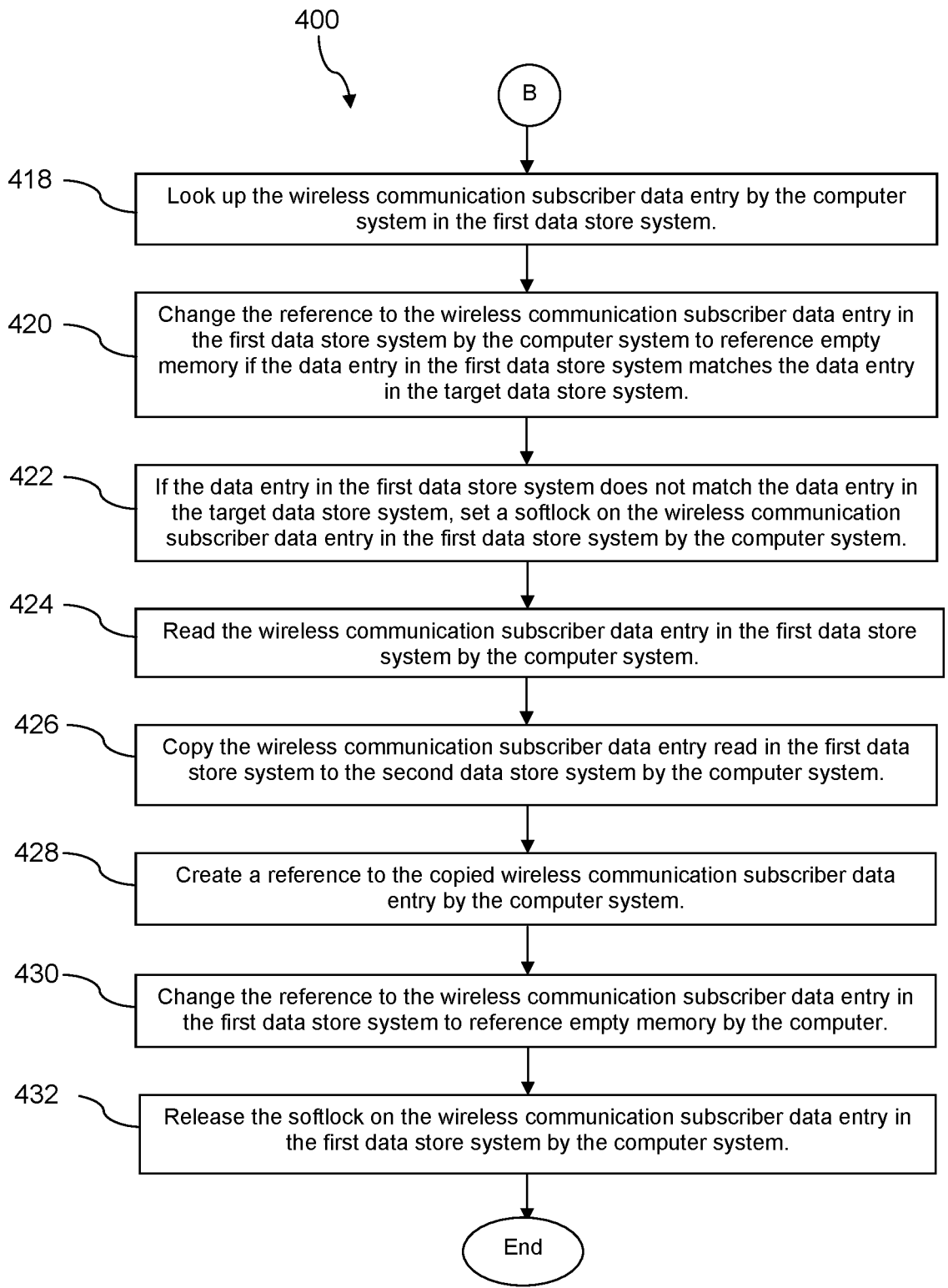

Turning now to FIG. 4A and FIG. 4B, a method 400 is described. The method 400 may be used for migrating a data store of wireless communication subscriber data from a source data store system 120 to a target data store system 124 and receiving an access or authentication request while continuing to handle requests to authenticate subscribers in the data store. At block 402, a list of subscriber data entries 122 to be migrated from the source data store system 120 to the target data store system 124 is created by a computer system. At block 404, a softlock is set on a subscriber data entry 122 in the source data store system 120 by the computer system. A softlock notifies the computer system of an incoming request on the subscriber data entry 122. In an embodiment, a transaction may be initiated when the softlock is set on the subscriber data entry 122, such as an LDAP transaction. At block 406, the subscriber data entry 122 in the source data store system 120 is read by the computer system.

At block 408, the subscriber data entry read in the source data store system 120 is copied by the computer system into the target data store system 124. In an embodiment, the subscriber data entry 122 may be copied by the computer system to a shadow journal of the target data store system 124. At block 410, a reference to the subscriber data entry 122 copied to the target data store system 124 is created by the computer system. At block 412, an access request comprising a reference to the subscriber data entry 122 is received before the subscriber data entry 122 has been committed to the target data store system 124. An access request may be an authentication request by a mobile device of the wireless communication subscriber such as when a wireless communication subscriber initiates a phone call on the mobile device. In an embodiment, the softlock notifies the computer system of the access request by the wireless communication subscriber. Upon notification, at block 414, a transaction of copying the subscriber data entry 122 to the target data store system 124 and the creation of the reference to the data entry 122 copied to the target data store system 124 is rolled back.

The computer system allows the access request on the subscriber data entry 122 without affecting the wireless communication subscriber access traffic. At block 416, the access request is completed, and the subscriber data entry 120 is looked up in the target data store system 124 by the computer system. At block 418, the subscriber data entry 122 is looked up in the source data store system 120 by the computer system. At block 420, the reference to the subscriber data entry 122 is changed in the source data store system 120 if the data entry 122 in the source data store system 120 matches the data entry in the target data store system 124. In an embodiment, if the data entry 122 on the source and target data store systems match, this indicates that the data entry migration from the source data store system 120 to the target data store system 124 was successful.

At block 422, a softlock is set on the subscriber data entry 122 by the computer system if the data entry in the source data store system 120 does not match the data entry in the target data store system 124. In an embodiment, if the data entry 122 on the source data store system 120 does not match the data entry on the target data store system 124, then the subscriber data entry migration was not successful, and the computer system will retry the migration of the subscriber data entry 122. The retry may occur after waiting by the computer system a period of time, such as 500 mS. In an embodiment, after a certain percentage of subscriber data entries 122 in the list have been migrated, the computer system may change to first looking up the subscriber data entry in the source data store system and then looking up the subscriber data entry in the target data store system to reduce the number of failures of matching the data entries 122. The change in order of looking up a subscriber data entry 122 may be initiated either manually by an authorized user, such as a system administrator, or automatically triggered after a predetermined percentage of subscriber data entries have been migrated.

At block 424, the subscriber data entry 122 in the source data store system 120 is read by the computer system. At block 426, the subscriber data entry 122 read in the source data store system 120 is copied to the target data store system 124 by the computer system. At block 428, a reference to the copied subscriber data entry 122 is created by the computer system. At block 430, the reference to the subscriber data entry 122 in the source data store system 120 is changed by the computer system to reference empty memory. At block 432, the softlock on the subscriber data entry 122 in the source data store system 120 is released by the computer system.

Figure 5:
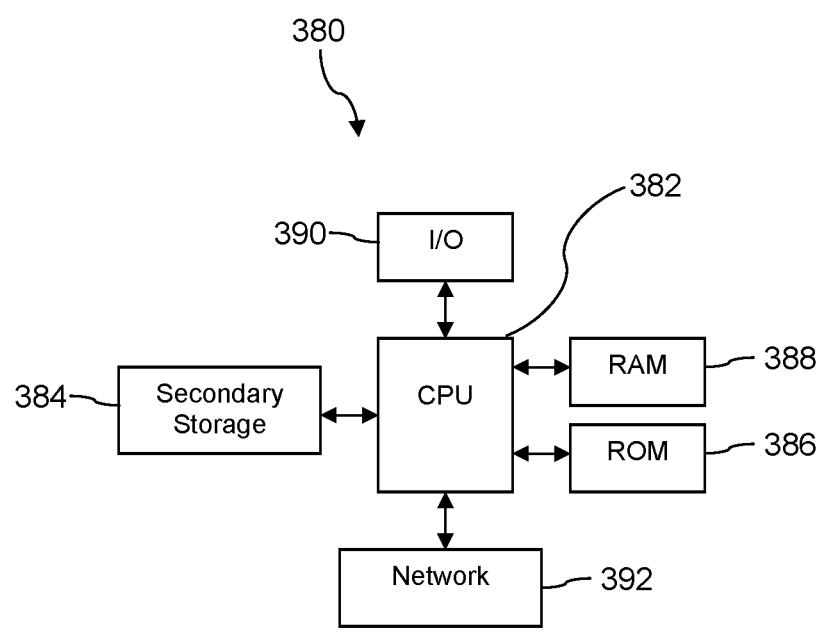
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with data stores including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile data store which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of migrating a data store of wireless communication subscriber data from a first data store system to a second data store system while continuing to handle requests to authenticate subscribers in the data store, where the second data store system is different from the first data store system, comprising:
    receiving during a first portion of a subscriber data migration a plurality of subscriber data provisioning requests by a computer system, wherein each provisioning request comprises a reference to a wireless communication subscriber data entry and a provisioning content;
    in response to each provisioning request,
        looking up a wireless communication subscriber data entry by the computer system in the first data store system based on the reference of the provisioning request;
        revising the wireless communication subscriber data entry by the computer system in the first data store system based on the provisioning content of the provisioning request;
        copying a revised wireless communication subscriber data entry identified by the reference by the computer system to the second data store system;
        creating a reference to the revised wireless communication subscriber data entry copied to the second data store system; and
        changing the reference to the wireless communication subscriber data entry in the first data store system to reference empty memory;
    during a second portion of the subscriber data migration, creating a list of wireless communication subscriber data entries to be migrated from the first data store system to the second data store system by the computer system, where the list of data entries to be migrated excludes data entries that are migrated during the first portion of the subscriber data migration;
    for each wireless communication subscriber data entry in the list;
        setting a softlock on the wireless communication subscriber data entry in the first data store system by the computer system;
        reading the wireless communication subscriber data entry in the first data store system by the computer system;
        copying the wireless communication subscriber data entry read in the first data store system by the computer system into the second data store system;
        creating a reference to the wireless communication subscriber data entry copied to the second data store system by the computer system;
        changing the reference to the wireless communication subscriber data entry in the first data store system to reference empty memory by the computer system; and
        releasing the softlock on the wireless communication subscriber data entry in the first data store by the computer system, where if an attempt to write the wireless communication subscriber data entry in the first data store system that has a softlock set occurs, any of the steps of copying the wireless communication subscriber data entry read into the second data store system and of creating a reference to the wireless communication subscriber data entry are backed out of the second data store system.

2. The method of claim 1, wherein the first data store system and the second data store system both comprise lightweight directory access protocol (LDAP) data store systems and the first data store system is developed by a first vendor and the second data store system is developed by a second vendor, where the second vendor is different from the first vendor.

3. The method of claim 1, where the second portion of subscriber data migration occurs after the first portion of subscriber data migration.

4. The method of claim 1, wherein the computer system copies the wireless communication subscriber data entry read in the first data store to a shadow journal, and after copying the wireless communication subscriber data entry to the shadow journal by the computer system, the wireless communication subscriber data entry is committed to the second data store system by the computer system.

5. The method of claim 1, wherein during the first portion of subscriber data migration, a first transaction, such as an LDAP transaction, is opened by the computer system on the first data store system before looking up the wireless communication subscriber data entry on the first data store system, wherein a second transaction, such as an LDAP transaction, is opened by the computer system on the second data store system before copying the revised wireless communication subscriber data entry to the second data store system, and wherein the first and second transactions are committed by the computer system after the reference to the wireless communication subscriber data entry in the first data store system is changed to reference empty memory.

6. The method of claim 1, wherein during the second portion of subscriber data migration, a first transaction, such as an LDAP transaction, is opened by the computer system on the first data store system before setting the softlock on the wireless communication subscriber data entry in the first data store system, wherein a second transaction, such as an LDAP transaction, is opened by the computer system on the second data store system before copying the wireless communication subscriber data entry into the second data store system, and wherein the first and second transactions are committed by the computer system after the reference to the wireless communication subscriber data entry in the first data store system is changed to reference empty memory.

7. The method of claim 1, wherein the actions during each of the first and second portion of subscriber data migration are performed by the computer system as an atomic transaction.

8. A method of migrating a data store of wireless communication subscriber data from a first data store system to a second data store system, where the second data store system is different from the first data store system, comprising:

creating by a computer system a list of wireless communication subscriber data entries to be migrated from the first data store system to the second data store system;

setting a softlock on a wireless communication subscriber data entry in the first data store system by the computer system, where the wireless communication subscriber data entry is identified in the list;

after setting the softlock, receiving a provisioning request that comprises a reference to the wireless communication subscriber data entry and a provisioning content;

in response to receiving the provisioning request, rolling back a transaction on the second data store system;

after rolling back the transaction,
looking up a wireless communication subscriber data entry by the computer system in the first data store system based on the reference of the provisioning request;
revising the wireless communication subscriber data entry by the computer system in the first data store system based on the provisioning content of the provisioning request;
copying a revised wireless communication subscriber data entry identified by the reference by the computer system to the second data store system;
creating a reference to the revised wireless communication subscriber data entry copied to the second data store system; and
changing the reference to the wireless communication subscriber data entry in the first data store system to reference empty memory.

9. The method of claim 8, wherein the computer system migrates wireless communication subscriber data entries from a single first data store system to a plurality of second data store systems.

10. The method of claim 8, wherein the computer system migrates wireless communication subscriber data entries from a plurality of first data store systems to a single second data store system.

11. The method of claim 8, wherein redundant data store systems of each of the first data store system and the second data store system exist, wherein every data store system replicates the wireless communication subscriber data entries of a primary data store system it references.

12. The method of claim 11, wherein when wireless communication subscriber data entries are migrated from the primary first data store system to the primary second data store system, the data store system replications of the primary first data store system and the primary second data store system are automatically updated by the computer system to reflect the migrated wireless communication subscriber data entries.

13. The method of claim 8, wherein the provisioning request comprising a reference to the wireless communication subscriber data entry is converted from a non-LDAP protocol by a provisioning proxy server to a LDAP protocol before entering the first data store system.

14. The method of claim 13, wherein the non-LDAP protocol comprises an extensible telephony markup language (XTML), an extensible markup language (XML), or a Simple Object Access Protocol language (SOAP).

15. A method of migrating a data store of wireless communication subscriber data from a first data store system to a second data store system while continuing to handle requests to authenticate subscribers in the data store, where the second data store system is different from the first data store system, comprising:

creating by a computer system a list of wireless communication subscriber data entries to be migrated from the first data store system to the second data store system;

setting a softlock on a wireless communication subscriber data entry in the first data store system by the computer system;

reading the wireless communication subscriber data entry in the first data store system by the computer system;

copying the wireless communication subscriber data entry read in the first data store system by the computer system into the second data store system;

creating a reference to the wireless communication subscriber data entry copied to the second data store system by the computer system;

before committing the wireless communication subscriber data entry in the second data store system, receiving an access request that comprises a reference to the wireless communication subscriber data entry;

in response to receiving the access request, rolling back a transaction of copying the wireless communication subscriber data entry into the second data store system and the creation of the reference to the wireless communication subscriber data entry copied to the second data store;

after rolling back the transaction and completing the access request,
looking up the wireless communication subscriber data entry by the computer system in the second data store system;

looking up the wireless communication subscriber data entry by the computer system in the first data store system;

if the wireless communication subscriber data entry in the first data store system matches the wireless communication subscriber data entry in the second data store system, changing the reference to the wireless communication subscriber data entry in the first data store system by the computer system to reference empty memory;

if the wireless communication subscriber data entry in the first data store system does not match the wireless communication subscriber data entry in the second data store system;

setting a softlock on the wireless communication subscriber data entry in the first data store system by the computer system;

reading the wireless communication subscriber data entry in the first data store system by the computer system;

copying the wireless communication subscriber data entry read in the first data store system by the computer system into the second data store system;

creating a reference to the wireless communication subscriber data entry copied to the second data store system by the computer system;

changing the reference to the wireless communication subscriber data entry in the first data store system to reference empty memory by the computer system; and releasing the softlock on the wireless communication subscriber data entry in the first data store by the computer system.

16. The method of claim 15, wherein after a predetermined amount of wireless communication subscriber data entries have been migrated from the first data store system to the second data store system by the computer system, the computer system first looks up the wireless communication subscriber data entry in the second data store system.

17. The method of claim 16, wherein after failing to find a data entry in the second data store system by the computer system, the computer system looks up the wireless communication subscriber data entry in the first data store system.

18. The method of claim 15, wherein after rolling back the transaction and completing the access request, waiting by the computer system a predetermined period of time before retrying.

19. The method of claim 15, wherein the first data store system and the second data store system both comprise lightweight directory access protocol (LDAP) data store systems and the first data store system is developed by a first vendor and the second data store system is developed by a second vendor, where the second vendor is different from the first vendor.

20. The method of claim 15, wherein the wireless communication subscriber data entry in the first data store system is copied by the computer system into a shadow journal of the second data store system before being committed to the second data store system.

\* \* \* \* \*